United States Patent
Marinier

(10) Patent No.: US 7,031,721 B2
(45) Date of Patent: Apr. 18, 2006

(54) METHOD AND SYSTEM FOR AVOIDING POWER OUTAGES AT THE BASE STATION IN CELLULAR SYSTEM USING VARIABLE RATE TRANSMISSION

(75) Inventor: Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 538 days.

(21) Appl. No.: 10/272,874

(22) Filed: Oct. 17, 2002

(65) Prior Publication Data

US 2004/0198405 A1 Oct. 7, 2004

Related U.S. Application Data

(60) Provisional application No. 60/381,567, filed on May 16, 2002.

(51) Int. Cl.
*H04Q 7/20* (2006.01)
(52) U.S. Cl. ............... 455/453; 455/512; 455/513; 370/345; 370/235
(58) Field of Classification Search ............ 455/453, 455/512, 513; 370/345, 235
See application file for complete search history.

(56) References Cited

U.S. PATENT DOCUMENTS 6,272,325 B1 * 8/2001 Wiedeman et al. ......... 455/117
6,280,009 B1 * 8/2001 Oertley .................. 305/136
6,289,009 B1   9/2001 Sato
6,334,047 B1 * 12/2001 Andersson et al. ......... 455/69
6,728,213 B1 * 4/2004 Tzeng et al. .............. 370/235
2002/0031105 A1 * 3/2002 Zeira et al. ............... 370/337
2004/0114570 A1 * 6/2004 Vikberg et al. ........... 370/351

FOREIGN PATENT DOCUMENTS

FR    EP1100283    * 11/1999
GB    2343331      *  5/2000
WO    WO02054604   *  7/2002

OTHER PUBLICATIONS

3rd Generation Partnership Project (3GPP™), Dec. 2001, 3rd Generation Partnership Project; Technical Specification Group Radio Access Network; UTRAN Iub Interface NBAP Signalling (Release 4), Section 8.2.17.2, Successful Operations, pps. 53-57.

* cited by examiner

*Primary Examiner*—Nay Maung
*Assistant Examiner*—Sujatha Sharma

(57) ABSTRACT

The present invention discloses a method and system for discarding the least amount of data in case a power outage is expected to occur in some timeslot during a future frame. The present invention discloses using Base Station (BS) information on the power transmitted during the last frame, along with information on the total amount of data, and the priority assigned thereto, that the BS has to transmit during upcoming frames, to make decisions on the type and quantity of data that should be removed to avoid severe power outage in the upcoming frames.

6 Claims, 3 Drawing Sheets

METHOD AND SYSTEM FOR AVOIDING POWER OUTAGES AT THE BASE STATION IN CELLULAR SYSTEM USING VARIABLE RATE TRANSMISSION

CROSS REFERENCE TO RELATED APPLICATION

This application claims priority from U.S. Provisional Application No. 60/381,567, filed on May 16, 2002, which is incorporated by reference as if fully set forth.

FIELD OF INVENTION

The present invention relates to the field of wireless communications. More specifically, the present invention is related to third generation cellular systems employing variable rate transmission at the downlink.

BACKGROUND

A third generation cellular system uses radio network controllers (RNC) and base stations (BS). Traffic from the core network to the user (downlink) is routed by the RNC to the BS(s) best able to serve a given user. The data sent by the RNC to the BS for a given user is segregated into transport channels (DCHs), each having their own characteristics in terms of coding type, rate and interleaving. The BS periodically collects the data in the form of transport blocks from the RNC, applies the appropriate coding and interleaving for each DCH, multiplexes the data from these different DCHs, and transmits it on the appropriate physical channel (DPCH) or DPCHs. The DPCH(s) is defined in terms of spreading code and, in case of discontinuous transmission (TDD), timeslot.

The power at which signals are transmitted on a given DPCH for a given user depends on several factors such as the path loss between the user and the BS, the interference level perceived by the user, and the signal-to-interference ratio (SIR) required for satisfactory transmission. The required SIR for a given user in a given DPCH may depend on the amount of data to be transmitted from the different DCHs during a specific time period (frame). This amount of data can be referred to as a transport format combination (TFC).

The user periodically requests the BS to adjust its power up or down using an uplink channel as the SIR it experiences varies down or up, respectively. The BS may decide to satisfy the request from the user or not. In a given timeslot, the total power used to transmit all DPCHs cannot exceed a certain threshold. If the BS finds itself in a situation where it is about to violate the threshold, the BS has to reduce the power of every DPCH (by the same relative amount) to avoid exceeding the threshold. This situation is referred to as a power outage.

Congestion is a general term that encompasses any situation where the BS is not able to satisfactorily transmit all the data sent by the RNC to the various users or user equipment (UE) connected to the BS. This may be due to a lack of hardware resources, processing power or transmission power. In order to provide a mechanism for the BS to prioritize between DCHs in case of congestion, the RNC assigns a priority to every DCH: the frame handling priority (FHP). The FHP is assigned by the RNC and transmitted to the BS so that the most important data gets through in case of congestion.

This approach, however, fails to indicate how much low priority data has to be removed to ensure avoidance of severe power outage. A method and system are therefore needed for removing the optimal amount of data in case of congestion, taking into account the power requirements and the FHP of the data.

SUMMARY

The invention is a method and system for avoiding power outages at the base station in cellular systems using variable rate transmission. When congestion is encountered, the invention removes the optimal amount of data while taking into account the power requirements and the frame handling priority of the data.

BRIEF DESCRIPTION OF THE DRAWING(S)

DETAILED DESCRIPTION OF THE PREFERRED EMBODIMENT(S)

Figure 1A:
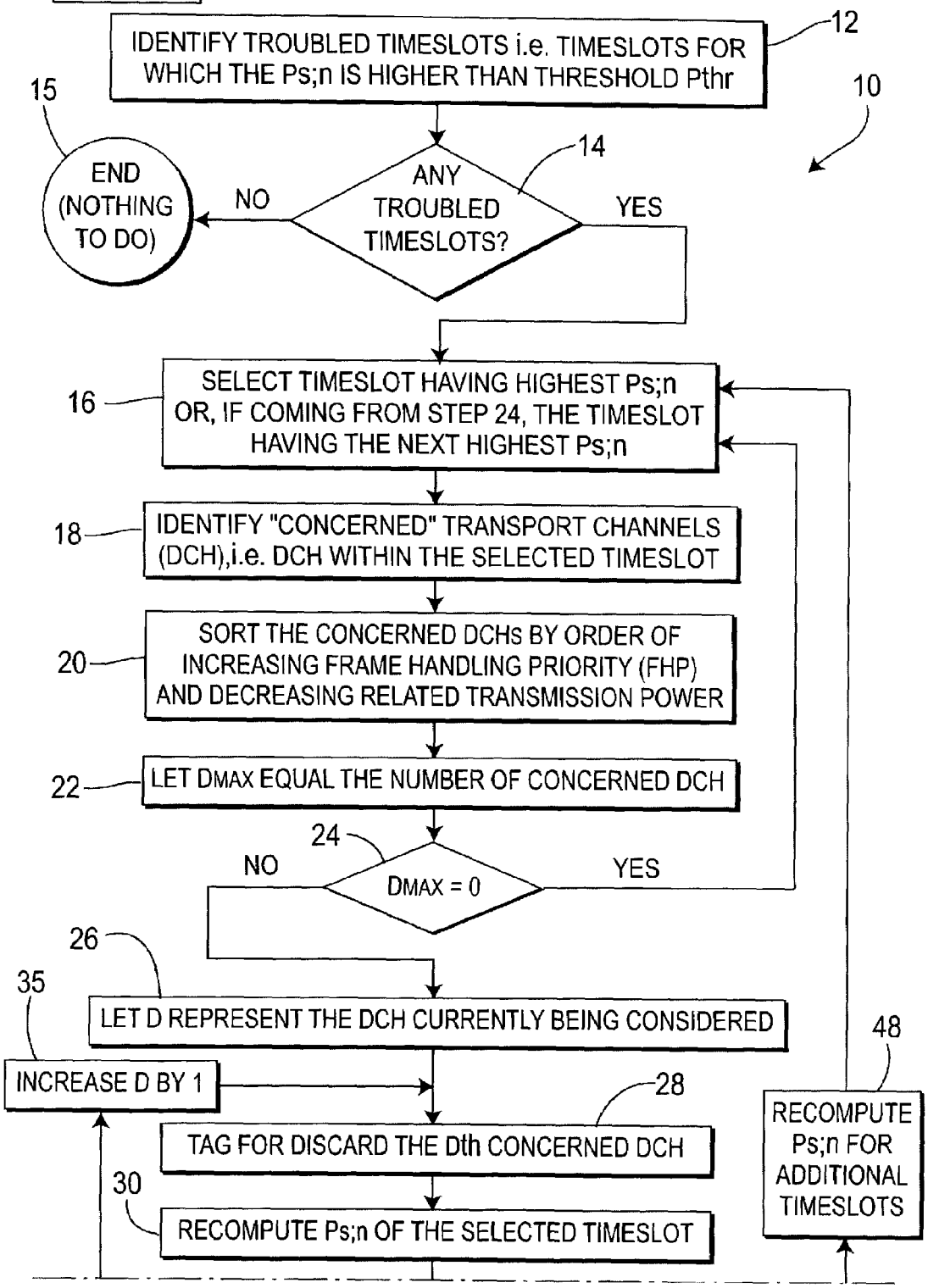
FIG. 1 is a flow chart showing a method for avoiding power outages at the base station in accordance with an embodiment of the present invention.

The present invention uses base station (BS) information regarding the power transmitted during the last frame, along with information regarding the total amount of data the BS has to transmit during upcoming frames, to make decisions on the type and quantity of data that should be removed to avoid a severe power outage in the upcoming frames. This allows the BS to determine not only which data should be removed, but also how much. The BS also considers the Frame Handling Priority (FHP) of the data in its decision-making. In situations where data needs to be removed, the invention removes data by order of priority and minimizes the amount of data that is removed in order to avoid an outage.

As mentioned, data sent from the RNC to the BS for a particular user is segregated into transport channels (DCHs). The data from a set of DCHs is multiplexed into a coded composite transport channel (CCTrCH). A CCTrCH is transmitted on a certain number of physical channels (DPCHs) that are allocated to the CCTrCH. The number of DPCHs that are used by a CCTrCH in a given frame depends on the amount of data that has to be transmitted during that frame.

When data from a DCH is discarded, the number of DPCHs required to support the data transmission for this user may be reduced. If some of the DPCHs that are no longer needed are in a selected timeslot, the transmission power requirement ($P_{s;n}$) for that timeslot will also be reduced. The present invention therefore evaluates the effect tagging different combinations of DCHs for data discard has on the $P_{s;n}$ of a selected timeslot. The $P_{s;n}$ of a selected timeslot may be recomputed and compared to a predetermined threshold ($P_{thr}$), which is indicative of the maximum allowed transmission power, while making assumptions that alternate between the data of various DCHs being transmitted and discarded. This enables the BS to select for transmission/discard a combination of DCHs of a selected timeslot that results in the optimal amount of data being discarded while ensuring that the $P_{s;n}$ of the selected timeslot does not exceed $P_{thr}$.

Before the BS can process (i.e. code, interleave and multiplex) and send the data for a particular DCH, it must have received data from the RNC and buffered the data that will be transmitted during the next n frames, where n is the number of frames over which this DCH is interleaved. The corresponding duration is commonly referred to as the transmission time interval (TTI) which varies from one DCH to another depending on the nature of the carried data. Thus, the data for a given DCH is buffered and sent every n frames.

In every frame, the BS may estimate the $P_{s;n}$ of every timeslot for the next frame, or if desired the next several frames, based on the data that will be transmitted for the different DCHs and the currently used transmission powers. If the BS determines (by comparing $P_{s;n}$ to $P_{thr}$) that the risk of outage is significant for a particular timeslot in an upcoming frame, that timeslot is selected for further evaluation. That is, the BS will look at the buffered data scheduled for transmission in the next frame(s), and discard the data of some DCHs so that $P_{s;n}$ in the affected timeslot and frame(s) does not exceed $P_{thr}$. The $P_{thr}$ may be adjusted to make the method more or less aggressive.

In order to compute a $P_{s;n}$ for a future frame, the following information is either assumed or known:

The transmission power of every DPCH of every CCTrCH for the future frame(s).

The transport format combination (TFC) of every CCTrCH during the future frame(s), as the TFC determines the number of DPCHs that are used.

For CCTrCHs having no data during the future frame, whether or not a special burst is expected to be sent.

The transmission powers of every used DPCH, however, are not known accurately even for the next frame. Therefore, the method of the present invention simply uses the latest transmission powers reported by Layer 1 control (i.e. Layer 1 of the BS) for computing $P_{s;n}$ estimates for any future frame. The latest transmission powers reported by Layer 1 control are preferably the ones which were used in the current frame, or the one before if the information is not made available in time.

The $P_{s;n}$ in timeslot s may be computed, for example, according to:

$$P_{s,n} = \sum_{k=1}^{N_k} u_k[s, c_k(n), d_k(n)] g(k, s; n),$$ Equation 1 where g(k,s; n) is the assumed transmission power, at frame n, of one DPCH used by CCTrCH k in slot s; $N_k$ is the number of users; $c_k(n)$ is the expected TFC of CCTrCH k at frame n; $d_k(n)$ indicates if a special burst is expected to be sent at frame n (note: if a special burst is expected it implies that there is no data in the TFC); and $u_k(s,c,d)$ is the number of DPCH's used by CCTrCH k in timeslot s if TFC c is sent or if a special burst is sent (where d=1 indicates that a special burst is expected to be sent).

Once $P_{s;n}$s are calculated for every timeslot in the next n future frames, they are compared to $P_{thr}$. If the method calculates that $P_{s;n}$ exceeds $P_{thr}$ in at least one timeslot and frame, that timeslot is evaluated for data discard. If there is more than one timeslot where $P_{s;n}$ is higher than $P_{thr}$, the timeslot having the highest $P_{s;n}$ is selected first and evaluated for data discard. The remaining timeslots will be evaluated in order of decreasing $P_{s;n}$. If, in contrast, there are no timeslots having a $P_{s;n}$ that exceeds $P_{thr}$, the method does nothing for this frame(s) and sends all data.

The DCHs of a timeslot selected for consideration for data discard are referred to as "concerned" transport channels (DCHs). The concerned DCHs are considered by the present invention to be defined as follows:

There is data to deliver for this DCH(s) in the next frame.

The DCH(s) is part of a CCTrCH which is "involved" in a troubled timeslot, i.e. a timeslot having a $P_{s;n}$ which exceeds $P_{thr}$. A CCTrCH is said to be "involved" in a troubled timeslot if at least one of the DPCHs onto which it is mapped is in that timeslot, as explained above.

The concerned DCHs are sorted according to a predetermined criteria. Preferably, the DCHs are sorted first by frame handling priority (FHP) of the DCH (low FHP's first) and second by the "related" transmission power of the DCH (high powers first). The "related" transmission power of a DCH is defined as the transmission power of the CCTrCH to which the DCH belongs. Thus, within a particular FHP value, the method will affect first the DCHs which constitute CCTrCHs having the highest power requirements. Those CCTrCHs could belong to users that have high path losses due to their unfavorable locations with respect to the serving BS.

The method then puts a "tag" on the first DCH of the list and re-computes $P_{s;n}$ for the selected troubled timeslot and frame as previously described, but now assuming that the tagged DCH will send no data. If $P_{s;n}$ is still above $P_{thr}$, it will proceed with the next DCH on the list, and continue until $P_{s;n}$ falls below $P_{thr}$ or until there are no more DCHs on the list.

At this point, the method continues despite the fact that $P_{s;n}$ may be below $P_{thr}$ because it is possible that some DCHs that have been tagged for discard could be untagged. That is, it is possible at this point that certain DCHs may be restored without causing $P_{s;n}$ to rise above $P_{thr}$ (or possibly to rise at all). Those DCHs should be spared. Therefore the method will go back in the reverse order of the DCH list and re-compute $P_{s;n}$, tentatively removing the tag of every DCH successively and checking if $P_{s;n}$ would increase and go back above the threshold. If removal of a particular DCH's tag does not result in $P_{s;n}$ rising above $P_{thr}$, that DCH's tag is removed. If, in contrast, removal of a DCH's tag causes $P_{s;n}$ to rise above $P_{thr}$, that DCH is retagged and the data therein will not be sent. The process ends after all tagged DCH's have been re-checked.

After the discard procedure has been completed for the first (i.e. the worst) troubled timeslot, the method may start over, as desired. In that case, $P_{s;n}$ is re-computed for all of the other timeslots and the method starts over with the new "worst" troubled timeslot, if any (and not including a timeslot for which the discard procedure has already taken place). The reason why $P_{s;n}$ must be re-computed for the other timeslots is that it is possible that $P_{s;n}$ in the other timeslots has decreased after the discard of the data from some DCH's to relieve congestion in another timeslot. This can happen if a CCTrCH uses DPCHs in different timeslots.

The method ends after all troubled timeslots have been processed. Then data is passed to Layer 1 control, with the "tagged" DCH's transmitting no data. In theory, it could happen that reducing the transport format of some DCH's to no data could result in an invalid TFC in some frame. If, after executing the discard procedure, the method finds that this will happen, the method could reduce the transport format of the DCHs that are sent at the same time until a valid TFC is encountered. If this is not possible (because, for example, the data from other DCHs have been sent earlier) the method could then revert to the transport formats offered to the BS by the RNC.

Figure 1B:
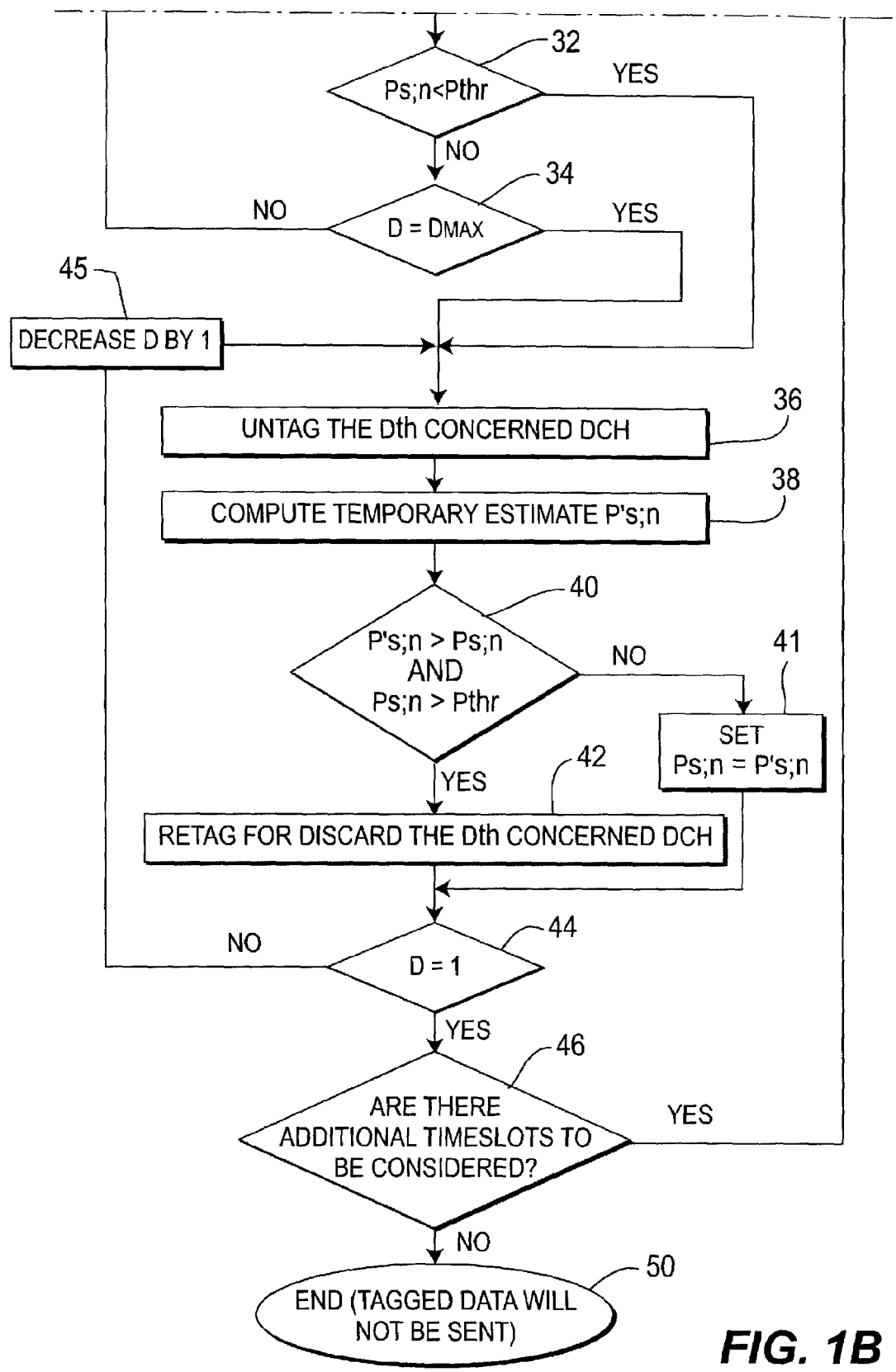

The steps performed to implement the method of the present invention are shown in FIG. 1 and indicated generally with reference numeral 10. Throughout the method, only data from DCHs that belong to a user that is assigned a DPCH in a selected timeslot will be considered for discard.

The method begins in step 12 by identifying troubled timeslots wherein data will be considered for discard. To identify troubled timeslots, an estimate of the $P_{s;n}$ for every timeslot s in the upcoming n frames is computed. The timeslots having a $P_{s;n}$ above a power threshold $P_{thr}$ are identified as troubled timeslots.

The $P_{thr}$ is an adjustable predetermined value based on the maximum allowed power of the BS. The $P_{thr}$ may be any value, but is preferably a multiple such as, for example, one (1) to five (5) times the maximum allowed power of the BS. The $P_{thr}$ may be used to control how aggressively data is discarded. More specifically, the higher the $P_{thr}$, the more conservative the method will be in discarding data. That is, a higher $P_{thr}$ will result in less timeslots being identified as troubled timeslots thereby reducing the amount of DCHs considered for data discard.

In step 14, the method determines whether any troubled timeslots were, in fact, identified in step 12. If there are no troubled timeslots, the method ends in step 15 and may be restarted as desired. If, alternatively, there are troubled timeslots, the method proceeds to step 16 where the troubled timeslot having the highest $P_{s;n}$ is selected. In step 18, the concerned DCHs are identified. As previously explained, data sent by the RNC to the BS for a given user is segregated into a set of DCHs which are multiplexed into a CCTrCH and mapped onto DPCHs for delivery to the user. DCHs using DPCHs in the currently selected troubled timeslot are identified as the "concerned" DCHs.

In step 20, the concerned DCHs are sorted in order of increasing FHP and decreasing related transmission power. The related transmission power of a particular DCH is the transmission power of the CCTrCH to which the DCH belongs. In step 22, $D_{max}$ is defined as the number of concerned DCHs. In step 24, the method determines whether $D_{max}$ is equal to zero. If $D_{max}$ is equal to zero, it means that there are no concerned DCHs in this timeslot and the method returns to step 16 to select the timeslot having the next highest $P_{s;n}$. If $D_{max}$ is not equal to zero, the method proceeds to step 26 where D is defined as the particular concerned DCH out of the group of concerned DCHs being considered and set to one (1). This ensures that the first concerned DCH on the list is considered first thereby allowing the concerned DCH with the lowest priority and highest transmission power to be evaluated first.

In step 28, the $D^{th}$ (i.e. the $1^{st}$, $2^{nd}$, $3^{rd}$, etc.) concerned DCH is tagged for discard. That is, if D is equal to one (1), the first concerned DCH would be tagged for discard. Then, in step 30, $P_{s;n}$ for the selected timeslot is recomputed assuming that the data in the $D^{th}$ concerned DCH will not be sent. Next, in step 32, the method determines whether $P_{s;n}$ is less than $P_{thr}$. If $P_{s;n}$ is less than $P_{thr}$, the method proceeds to step 36 where the $D^{th}$ concerned DCH is untagged so that the method may confirm whether that DCH necessarily needs to be discarded. If $P_{s;n}$ is not less than $P_{thr}$, the method determines, in step 34, whether D is equal to $D_{max}$, i.e. whether all of the concerned DCHs have been considered. If D is not equal to $D_{max}$, it means that all of the concerned DCHs have not been considered and the method proceeds to step 35. In step 35, D is increased by one so that the next concerned DCH on the list may be tagged for discard and considered, as explained above.

Once steps 28 through 35 have been completed, as needed, for each of the concerned DCHs, the data required to reduce $P_{s;n}$ below $P_{thr}$ has been tagged for discard. There is a risk, however, that too much data may have been tagged for discard. The method, therefore, continues by evaluating the effect of tagging for discard different combinations of concerned DCHs. This is done to ensure that the optimal amount of data is being discarded so that too much data is not unnecessarily discarded while reducing the $P_{s;n}$ of a selected timeslot.

As mentioned above, the $D^{th}$ concerned DCH is untagged in step 36. Then, in step 38, a temporary estimate of transmission power requirement ($P'_{s;n}$) is computed. The $P'_{s;n}$ is computed taking into account the current status (i.e. tagged or untagged) of the concerned DCHs.

In step 40, the method evaluates $P'_{s;n}$ in relation to $P_{s;n}$ and $P_{thr}$. Specifically, in step 40, the method determines whether $P'_{s;n}$ is greater than $P_{s;n}$ and $P_{thr}$. If $P'_{s;n}$ is greater than both $P_{s;n}$ and $P_{thr}$, it means that $P_{s;n}$ for the selected timeslot cannot be sufficiently reduced with the data in the $D^{th}$ concerned DCH being transmitted. Therefore, if untagging a concerned DCH results in a $P'_{s;n}$ that is greater than $P_{s;n}$ and $P_{thr}$, that concerned DCH is retagged in step 42 resulting in the data in that concerned DCH being discarded. If, in contrast, the method determines in step 40 that $P'_{s;n}$ is not greater than $P_{s;n}$ and $P_{thr}$, it means that $P_{s;n}$ for the selected timeslot may be sufficiently reduced while transmitting the data contained in the $D^{th}$ concerned DCH. In that case, the $D^{th}$ concerned DCH remains untagged and the method proceeds to step 41 where $P_{s;n}$ is set equal to $P'_{s;n}$.

Regardless of whether the $D^{th}$ concerned DCH is retagged or not, the method proceeds to step 44. In step 44, the method determines whether the $D^{th}$ concerned DCH is the first concerned DCH thereby ensuring that all of the concerned DCHs which were previously considered for receiving a tag are similarly reconsidered, in reverse order, for being untagged. This allows the proper combination of concerned DCHs to be tagged for data discard thereby optimizing $P_{s;n}$ in relation to $P_{thr}$ (i.e. selecting the proper combination of concerned DCHs for data discard so that the minimum amount of data is discarded while ensuring that $P_{s;n}$ does not exceed $P_{thr}$). It is important to note that by optimizing $P_{s;n}$ in relation to $P_{thr}$, the method also causes $P_{s;n}$ to be as close as possible to $P_{thr}$ without, of course, exceeding $P_{thr}$.

If the $D^{th}$ concerned DCH is the first (i.e. D is equal to 1), the method will proceed to step 46. If not, however, the method continues with step 45 where D is decreased by one so that the next concerned DCH may be considered for being untagged.

Once all of the appropriate concerned DCHs have been considered (steps 28 to 35) and reconsidered (steps 36 to 45) for data discard, the method will determine in step 46 whether there are any additional timeslots that were previously identified as troubled timeslots in step 12. If there are additional timeslots, the method proceeds to step 48 where $P_{s;n}$ is recomputed. Once $P_{s;n}$ has been recomputed for all of the remaining timeslots, the timeslot that now has the highest $P_{s;n}$ is selected in step 16 and the method continues from there, as described above. If, alternatively, there are no additional troubled timeslots, the method ends (step 50) and the tagged data is not sent.

So as to provide an example of how the method of the present invention may be implemented, assume there are three concerned DCHs, D1, D2 and D3 where D3 has the highest FHP and D1 and D2 have the same FHP. Further assume that $P_{thr}$ is 1.0 W and that DCHs D1, D2 and D3 have individual related transmission powers of 0.1 W, 0.1 W and 1.1 W, respectively.

Given the FHP and related transmission power of the DCHs, they would be sorted as D1, D2 and D3 in step 20 (i.e. increasing FHP first and then decreasing related transmission power). Therefore, for D1, D2 and D3, D is equal to 1, 2 and 3, respectively. Furthermore, assume that the $P_{s;n}$s when some or all of the data from those channels are as follows:

| | |
|---|---|
| D1 + D2 + D3: | 1.3 W |
| D2 + D3 only: | 1.2 W |
| D3 only: | 1.1 W |
| D2 only: | 0.1 W |
| D1 + D2 only: | 0.2 W |

As can be seen above, transmitting all three DCHs results in a $P_{s;n}$ of 1.3 W which is 0.3 above $P_{thr}$. Therefore, data will need to discarded in order to avoid exceeding $P_{thr}$.

In this example, low priority channels D1 and D2 would be initially tagged for discard. D1 and D2 are the first DCHs tagged for discard because, as mentioned, the concerned DCHs are sorted first according to increasing FHP and then according to their related transmission power. Tagging D1 and D2 for discard, however, is not sufficient to reduce $P_{s;n}$ to $P_{thr}$. That is, discarding the data in DCHs D1 and D2 causes $P_{s;n}$ to drop from 1.3 W to 1.1 W which is still above the assumed $P_{thr}$ of 1.0 W. Therefore, D3 will also be tagged for discard thereby causing $P_{s;n}$ to be below $P_{thr}$. Unfortunately, however, tagging D3 for discard causes $P_{s;n}$ to drop to 0.0 W causing no data at all to be sent. This is overkill, however, because $P_{s;n}$ could have been brought into conformance with $P_{thr}$ by simply discarding the data in D3 and allowing the data in DCHs D1 and D2, although it is of a lower FHP than D3, to nevertheless be transmitted.

This type of situation is taken care of in the untagging phase of the method (steps 36–45). The method would first untag D3. D3's tag, however, would be reapplied in step 42 because, in step 40, the $P'_{s;n}$ would be greater than $P_{s;n}$ and $P_{thr}$ (i.e. $P'_{s;n}$ would equal 1.1 W, $P_{s;n}$ would equal 0.0 W and $P_{thr}$ would equal 1.0 W). It is important to note that the $P_{s;n}$ used in step 42 is the $P_{s;n}$ as affected by the preliminary tags that are placed in steps 26 to 35. That is, in this example, D1, D2 and D3 were all tagged resulting in a $P_{s;n}$ of 0.0 W being calculated in step 30. Therefore, it is that $P_{s;n}$ that is compared to $P'_{s;n}$ in step 40. If, however, $P_{s;n}$ is set equal to $P'_{s;n}$ in step 41, that $P_{s;n}$ will be used in step 40 if the method at step 44 proceeds to step 45 and so on. Generally speaking, whenever $P_{s;n}$ is compared to another parameter, the latest computed $P_{s;n}$ is used.

Returning to the example, once D3's tag is reapplied in step 42, the method proceeds to step 44 where the method determines whether D is equal to 1 (i.e. whether the concerned DCH currently being considered is the first concerned DCH). Since D3 is the third concerned DCH and not the first, the method continues because all of the previously considered DCHs have yet to be reconsidered. Therefore, D will be decreased by 1 in step 45 thereby causing D2 to be untagged in step 36. In step 37, now that D3 and D1 are tagged, but D2 has been untagged, $P'_{s;n}$ will become 0.1 W (1.3 W−1.1 W−0.1 W=0.1 W) in step 38. Therefore, $P'_{s;n}$ will not be greater than both $P_{s;n}$ and $P_{thr}$. That is, $P'_{s;n}$ will be greater than $P_{s;n}$, but not $P_{thr}$ [i.e. 0.1 W ($P'_{s;n}$) compared with 0.0 W ($P_{s;n}$) and 1.0 W ($P_{thr}$)]. Since $P'_{s;n}$ is still below $P_{thr}$ despite the fact that the data in DCH D2 has been untagged, D2's tag is permanently removed. The same thing happens for D1. Therefore, for the situation outlined above, the data in D3 would be discarded while the data in D1 and D2 is transmitted.

Figure 2:
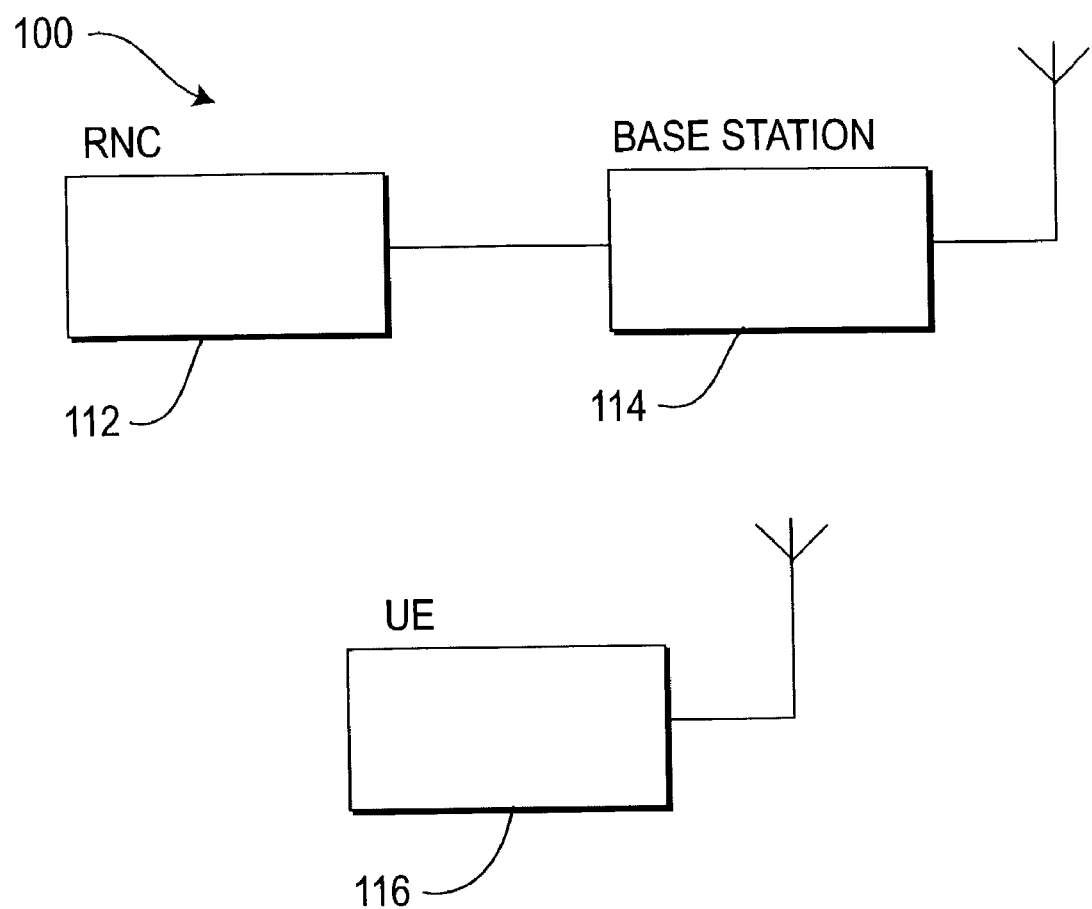
FIG. 2 is a system wherein the optimal amount of data is removed when congestion is encountered in accordance with an embodiment of the present invention.

Referring now to FIG. 2, a system 100 is shown for avoiding power outages at the BS in cellular systems using variable rate transmission. The system 100 includes a RNC 112, a BS 114 and a UE 116.

Data sent by the RNC 112 to the BS 114 for a given user is segregated into DCHs. The BS 114 multiplexes the data from the DCHs and maps it onto the appropriate DPCHs. The BS 114 may estimate the $P_{s;n}$ of every timeslot for the next frame, or if desired the next several frames, based on the data that will be transmitted for the different DCHs and the currently used transmission powers. Timeslots identified as troubled timeslots (i.e. those having a $P_{s;n}$ which exceeds $P_{thr}$) are evaluated for data discard.

The data in the DCHs of the troubled timeslots may be evaluated in order to identify the optimal combination of DCHs for which data may be transmitted/discarded. Once the DCHs that result in the optimal amount of data being discarded are identified, data in those DCHs is not sent by the BS 114. The BS 114 may send a signal to the RNC 112 indicating which data was not sent.

Although the present invention has been described in detail, it is to be understood that the invention is not limited thereto, and that various changes can be made therein without departing from the spirit and scope of the invention, which is defined by the attached claims.

What is claimed is:

1. A method for avoiding power outages at a base station in cellular systems using variable rate transmission, the method comprising:
   a) computing a transmission power requirement estimate for every timeslot in at least one future frame;
   b) identifying timeslots having a transmission power requirement estimate above a predetermined threshold;
   c) selecting the timeslot having the highest transmission power requirement;
   d) identifying transport channels within the selected timeslot;
   e) sorting the identified transport channels first by increasing frame handling priority and second by decreasing related transmission power;
   f) applying a tag that tentatively indicates that data within a transport channel to which the tag is applied will be discarded and recomputing the transmission power requirement estimate of the selected timeslot for each identified transport channel in the order said transport channels were sorted until the transmission power requirement estimate is equal to or less than a predetermined threshold;
   g) going in reverse order in which the transport channels were sorted and tentatively removing the tag of each transport channel previously tagged while again recomputing the transmission power requirement estimate after each successive tag is removed to determine whether removal of any of the tags causes the transmission power requirement estimate to exceed the predetermined threshold; and
   h) refraining from sending the data for any transport channels whose tag removal causes the transmission power requirement estimate to exceed the predetermined threshold.

2. The method of claim 1 wherein the estimate of the transmission power requirement estimate for each timeslot is computed using information from a current frame.

3. The method of claim 2 wherein the transmission power requirement estimate for each timeslot is calculated based on transmission powers used during the current frame.

4. The method of claim 1 wherein the predetermined threshold is based on maximum allowed power of the base station.

5. The method of claim 4 wherein the predetermined threshold is a multiple of the maximum allowed power of the base station.

6. A system for avoiding power outages in cellular systems using variable rate transmission, the system comprising:
   a) a radio network controller wherein data is sent to a base station for at least one user;
   b) wherein data sent from the radio network controller to the base station is assigned a frame handling priority and segregated into transport channels that are mapped onto physical channels for delivery to the at least one user; and
   c) the base station being adapted to identify timeslots in at least one future frame that have a transmission power requirement estimate above a predetermined threshold and to optimize the transmission power requirement estimate in relation to the predetermined threshold for each of the identified timeslots; wherein the base station optimizes the transmission power requirement estimate by:

i) identifying transport channels within at least one of the identified timeslots;

ii) sorting the identified transport channels first by increasing frame handling priority and second by decreasing related transmission power;

iii) applying a tag that tentatively indicates that data within a transport channel to which the tag is applied will be discarded and recomputing the transmission power requirement estimate of the selected timeslot for each identified transport channel in the order said transport channels where sorted until the transmission power requirement estimate is equal to or less than a predetermined threshold;

iv) going in reverse order in which the transport channels were sorted and tentatively removing the tag of each transport channel previously tagged while again recomputing the transmission power requirement estimate after each successive tag is removed to determine whether removal of any of the tags causes the transmission power requirement estimate to exceed the predetermined threshold; and v) refraining from sending the data for any transport channels whose tag removal causes the transmission power requirement estimate to exceed the predetermined threshold.

* * * * *

UNITED STATES PATENT AND TRADEMARK OFFICE
CERTIFICATE OF CORRECTION

PATENT NO. : 7,031,721 B2 Page 1 of 1
APPLICATION NO. : 10/272874
DATED : April 18, 2006
INVENTOR(S) : Paul Marinier It is certified that error appears in the above-identified patent and that said Letters Patent is hereby corrected as shown below:

ON THE TITLE PAGE

Item (56), page 1, right column, OTHER PUBLICATIONS, line 3, after "UTRAN", delete "lub" and insert therefor --Iub--.

Signed and Sealed this

Twelfth Day of December, 2006

JON W. DUDAS
*Director of the United States Patent and Trademark Office*